United States Patent
Suzuki et al.

(10) Patent No.: US 6,376,029 B1
(45) Date of Patent: Apr. 23, 2002

(54) FINE PARTICLES COVERED BY CHOLESTERIC LIQUID CRYSTAL

(75) Inventors: Shinichiro Suzuki; Suzushi Nishimura; Shinichi Komatsu, all of Kanagawa (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/673,488

(22) PCT Filed: Apr. 14, 1999

(86) PCT No.: PCT/JP99/01994

§ 371 Date: Oct. 16, 2000

§ 102(e) Date: Oct. 16, 2000

(87) PCT Pub. No.: WO99/54409

PCT Pub. Date: Oct. 28, 1999

(30) Foreign Application Priority Data

Apr. 14, 1998 (JP) .......................................... 10-102303

(51) Int. Cl.[7] .......................... C09K 19/52; C08K 9/04; B32B 19/02; B32B 27/36

(52) U.S. Cl. ........................... 428/1; 428/407; 428/480; 427/212; 252/299.01; 523/205

(58) Field of Search ........................... 428/1, 407, 480; 427/212; 252/299.01; 523/205

(56) References Cited

U.S. PATENT DOCUMENTS 3,947,183 A * 3/1976 Haas et al.
5,242,617 A * 9/1993 Metzger et al.
5,260,109 A * 11/1993 Iida et al.

* cited by examiner

*Primary Examiner*—Tae H. Yoon
(74) *Attorney, Agent, or Firm*—Scully, Scott, Murphy & Presser

(57) ABSTRACT

Fine particles having a thin cholesteric liquid crystal film superior in visibility for a selectively reflected light are provided. Non-liquid crystalline fine particles for nucleus are dispersed in a cholesteric liquid crystal solution, then the solvent used is removed, followed by heat-treatment and cooling, to afford fine particles coated with a thin cholesteric liquid crystal film.

7 Claims, No Drawings

FINE PARTICLES COVERED BY CHOLESTERIC LIQUID CRYSTAL

TECHNICAL FIELD OF THE INVENTION

The present invention relates to fine particles coated substantially throughout the whole surfaces thereof with a thin film of a cholesteric liquid crystal having a selective reflection for a circularly polarized light of a specific wavelength.

PRIOR ART

In a cholesteric liquid crystal, interior liquid crystal molecules thereof are aligned in a regularly twisted state so as to describe a spiral in a film thickness direction, having a unique optical property based on the fact that the helical axis thereof is parallel to the film thickness direction, which optical property is a selective reflection of circularly polarized light in a specific wavelength band. Utilizing this property, various applications have been developed such as, for example, application to an optical use in which only the right or left circularly polarized light is taken out from non-polarized light and an ornamental use which utilizes the phenomenon that reflected/transmitted light is colored because the action in question is limited to a specific wavelength band. Industrially, a cholesteric liquid crystal film obtained by forming a cholesteric liquid crystal into a thin film has so far been mainly manufactured and used in various fields because it is superior in its handleability and processability.

However, the use of the cholesteric liquid crystal in the form of a film inevitably encounters a limit in its industrial application. For development to a further industrial application, the production of fine particles having the selective reflection of circularly polarized light caused by cholesteric liquid crystal are being tried.

As a conventional method for producing fine particles having a selective reflection of circularly polarized light there is proposed, for example in Japanese Patent Laid Open No. 220350/1994, a method wherein a cholesteric liquid crystal is formed into a thin film and this cholesteric liquid crystalline film is pulverized into fine particles. However, it is only a direction perpendicular to the helical axis of cholesteric orientation that the selective reflection of cholesteric liquid crystal is observed, while in a horizontal section there is not obtained the selective reflection. Thus, the selective reflection surface is limited. Besides, since pulverization is performed for obtaining fine particles, a selective reflection surface is rendered uneven, resulting in an increase of scattered light. Thus, the fine particles obtained by the above conventional method are very weak in the selective reflection characteristic of cholesteric liquid crystal and also poor in visibility.

OBJECT OF THE INVENTION

Taking note of the point that the above conventional problems of fine particles having a selective reflection of circularly polarized light are attributable to the smallness of a region which exhibits the circularly polarized light selectivity on the surfaces of the fine particles, and having made earnest studies, we found out that fine particles having a strong selective reflection of circularly polarized light and superior in reflected light visibility can be obtained not by merely pulverizing a cholesteric liquid crystal film but by coating the surfaces of fine particles as nucleus with a cholesteric liquid crystal having a selective reflection of circularly polarized light.

SUMMARY OF THE INVENTION

The present invention, in the first aspect thereof, resides in fine particles comprising non-liquid crystalline fine particles as nucleus and a thin cholesteric liquid crystal layer formed on the fine particle surfaces, the thin cholesteric liquid crystal layer exhibiting a selective reflection of circularly polarized light substantially in all directions of the fine particles.

The present invention, in the second aspect thereof, resides in a method for producing the above fine particles, which method comprises dispersing non-crystalline organic or inorganic fine particles in a cholesteric liquid crystal solution, removing a solvent used, appealing in a temperature region in which the liquid crystal takes a cholesteric phase and subsequent cooling.

MODE FOR CARRYING OUT THE INVENTION

The present invention will be described in detail hereinunder.

The cholesteric liquid crystal used in the present invention is not specially limited insofar as it forms a cholesteric oriention in the state of liquid crystal. Particularly, a cholesteric liquid crystalline polymer is preferred in view of its easiness of handling and of thin film formation. As the cholesteric liquid crystalline polymer, one exhibiting a cholesteric alignmentability and capable of being fixed easily in its aligned state is preferred.

Usually, for fixing the cholesteric alignment stably it is particularly preferred, when viewed in the phase sequence of liquid crystal, that there be no crystal phase in a lower temperature range than cholesteric phase. If a crystal phase is present, an inevitable passage through the crystal phase at the time of cooling for alignment fixing results in destruction of the cholesteric orientation once obtained. Therefore, as the cholesteric liquid crystalline polymer used in the present invention, one not only having a satisfactory cholesteric orientability based on an interfacial effect but also assuming a glassy state at a temperature lower than cholesteric phase, i.e., below the liquid crystal transition point of the polymer.

As examples of such a cholesteric liquid crystalline polymer are mentioned cholesteric liquid crystalline polymer compositions each comprising a nematic liquid crystalline polymer and an optically active component, and cholesteric liquid crystalline polymers each having an optically active group in the molecule.

As examples of nematic liquid crystalline polymers are mentioned main chain type liquid crystalline polymers such as polyesters, polyimides, polyamides, polycarbonates, and polyester-imides, and side chain type liquid crystalline polymers such as polyacrylates, polymethacrylates, polymalonates, and polysiloxanes. Above all, liquid crystalline polyesters are preferred in point of their easiness of preparation, transparency, easiness of alignment and fixing, and glass transition point.

As typical examples of optically active components used for imparting twist to the above nematic liquid crystalline polyesters and for the formation of a cholesteric alignment, there are mentioned optically active low-molecular compounds or compositions. Any low-molecular compound or composition is employable in the present invention insofar as it has an optically active group. From the standpoint of compatibility with the liquid crystalline polyester, however, optically active liquid crystalline low-molecular compounds or compositions are preferred.

Optically active high-molecular compounds or compositions are also mentioned as examples of optically active components. Any high-molecular compound or composition is employable if only it contains an optically active group in the molecule. From the standpoint of compatibility with the above nematic liquid crystalline polyester, however, optically active liquid crystalline high-molecular compounds or compositions are preferred. Examples are polyacrylates, polymethacrylates, polymalonates, polysiloxanes, polyesters, polyamides, polyester-amides, polycarbonates, polypeptides, cellulose, and compositions containing these liquid crystalline polymers as a main component. Particularly, aromatic, optically active polyesters are preferred from the standpoint of compatibility with the above nematic liquid crystalline polyester.

As examples of cholesteric liquid crystalline polymers having an optically active group in the molecule are mentioned those having an optically active group in the polymer main chain such as polyesters, polyimides, polyamides, polycarbonates, and polyester-imides, as well as those having an optically active group in the polyme side chain such as polyacrylates, polymethacrylates, polymalonates, and polysiloxanes. Above all, optically active liquid crystalline polyesters are preferred in point of easiness of preparation, transparency, easiness of alignment and fixing, and glass transition point.

The fine particles of the present invention are obtained by dissolving the above cholesteric liquid crystal in a solvent, dispersing fine particles as nucleus in the solution, then removing the solvent, and subsequent heat-treatment and cooling.

The solvent for dissolving the cholesteric liquid crystal differs depending on the type of the cholesteric liquid crystal used, but usually there may be used any of such halogenated hydrocarbons as chloroform, dichloroethane, tetrachloroethane, trichloroethylene, tetrachloroethylene, and o-dichlorobenzene, mixtures thereof with phenols, ketones, ethers, dimethylformamide, dimethylacetamide, dimethyl sulfoxide, N-methylpyrrolidone, sulfolane, and cyclohexane.

The concentration of the cholesteric liquid crystal in the solution is suitabely selected, depending on the type of the liquid crystal used, but is usually in the range of 1 to 50 wt %, preferably 3 to 30 wt %.

A crosslinking component for the liquid crystalline polymer such as a melamine compound or an epoxy compound may be incorporated in the solution insofar as it does not impair the effect of the present invention. Where such a crosslinking component is used, the proportion thereof is usually in the range of 0.2 to 20 wt %, preferably 0.5 to 5 wt %, relative to the cholesteric liquid crystal though it differs depending on the type of the crosslinking component used. Further, a surface active agent may be added into the solution for lowering the surface tension of the solution and for enhancing the wettability for the fine particles serving as a nucleus.

In the fine particles of the present invention, as the fine nucleus particles there may be used fine particles of an inorganic or organic fine powder insofar as they assume a solid state in at least a part of the heat-treatment temperature for the cholesteric liquid crystal, i.e., the temperature region in which the cholesteric liquid crystal forms a cholesteric alignment, and insofar as they are relatively stable. As examples of such fine particles are mentioned fine organic resin particles such as polymethyl methacrylates, fluorine resins, and polyethylene, as well as inorganic fine particles such as alumina, silica, barium sulfate, aluminum hydroxide, calcium carbonate, titanium oxide, zinc white, various metals, and carbon black. These fine particles range in particle diameter usually from 0.1 to 5,000 $\mu$m, preferably 0.3 to 500 $\mu$m. The shape of the fine particles is not specially limited. As the fine particles for nucleus there should be selected inert fine particles which do not dissolve in the solvent used in the cholesteric liquid crystal solution.

By changing the color of the above fine particles for nucleus it is made possible to impart a change in the visibility for a selectively reflected light of the thin cholesteric liquid crystal film. Usually, the visibility can be enhanced by using fine particles of black or dark color as nucleus.

As to the proportion of fine particles dispersed in the cholesteric liquid crystal solution, it is suitably selected on the basis of the type of the fine particles and intended film thickness. For example, it is in the range of 5 to 90 wt %, preferably 10 to 70 wt %.

For dispersing the fine particles as nucleus into the cholesteric liquid crystal solution there may be adopted any of the methods known in this field, e.g., a dispersing method which utilizes agitation. No limitation is imposed on how to disperse the fine particles. There also may be adopted a method which accelerates the dispersion of fine particles in the solution with use of, for example, ultrasonic wave or a ball mill.

As noted above, after dispersing the nuclear fine particles in the cholesteric liquid crystal solution, he solvent is removed and heat-treatment is conducted in the temperature region in which the cholesteric liquid crystal exhibits a cholesteric alignment. As solvent removing means, drying is preferred. The heat-treatment may be performed simultaneously with the drying for removal of the solvent. Solvent drying-off conditions are not specially limited. For example, there may be adopted drying at room temperature, drying in a drying oven, spraying of warm or hot air, or heating on a hot plate.

The heat-treatment is performed in the temperature region in which the cholesteric liquid crystal exhibits a cholesteric alignment. The temperature of the heat-treatemnt differs depending on the type of the cholesteric liquid crystal used and that of the solvent used, but is usually in the range of 70 to 250° C., preferably 100 to 210° C.

How to perform the heat-treatment is not specially limited insofar as the shape of the fine particles can be retained and the heat-treatment method used does not impair the formation of a cholesteric orientation. For example, there may be adopted a heat-treatment method which uses a hot air carrying type dryer. As examples of hot air carrying type dryers there are mentioned a spray dryer and an airborne dryer. As examples of spray dryers are mentioned horizontal concurrent type, cylindrical concurrent type, cylindrical countercurrent type, cylindrical composite flow type, cyclone composite flow type, and cylindrical or cyclone concurrent type. As examples of airborne dryers are mentioned a direct loading type and a dispersing machine using type.

By cooling after the above heat-treatment there can be obtained fine particles of the present invention comprising the nuclear fine particles coated substantially throughout the whole surfaces thereof with a thin liquid crystal film having a thickness of 0.3 to 100 $\mu$m, preferably 0.5 to 50 $\mu$m, more preferably 1 to 10 $\mu$m, most preferably 2 to 5 $\mu$m. The method for the cooling is not specially limited. The cooling may be done by exposing the heat-treated fine particles from the heat-treatment atmosphere into an atmosphere held at a temperature below the liquid crystal transition point of the polymer, e.g., into an atmosphere of room temperature. Forced cooling and heat removal, such as air or water cooling, may be done for enhancing the production efficiency.

In fine particles of the present invention thus obtained, the fine particles as nucleus are coated with a think liquid crystal film substantially throughout the whole surfaces thereof. The thin liquid crystal film exhibits a satisfactory selective reflection of circularly polarized light substantially in all directions of the fine particles because there is formed a cholesteric alignment having a helical axis in the film thickness direction. Thus, the fine particles of the present invention are characteristic in that they are superior in the visibility for a selectively reflected light.

Further, by preparing pigments using the fine particles of the present invention as a principal component, there can be obtained coating materials, printing ink, plastics, textile feeds, and cosmetic preparations, which have a unique color developing effect of the cholesteric liquid crystal.

EXAMPLES

The present invention will be described below in more detail by way working examples thereof, provided the present invention is not limited to the following examples.

Example 1

70 g of a nematic liquid crystalline polyester (1) and 30 g of an optically active polyester (2) were dissolved in 900 g of N-methylpyrrolidone to prepare a 10% polymer solution. Then, 200 g of carbon black (MA100, a product of Mitsubishi Chemical Co.) was added to the solution, followed by agitation for dispersion. Using a spray dryer (SD-100, a product of Tokyo Rika Kikai Co.), the solution was heat-treated at 160° C., to afford 280 g of fine particles of blue color exhibiting a strong selective reflection of circularly polarized light. 95% of the fine particles thus obtained were not larger than 300 µm in diameter. Central wavelength of selective reflection was found to be 480 nm.

Nematic liquid crystalline polyester (1)

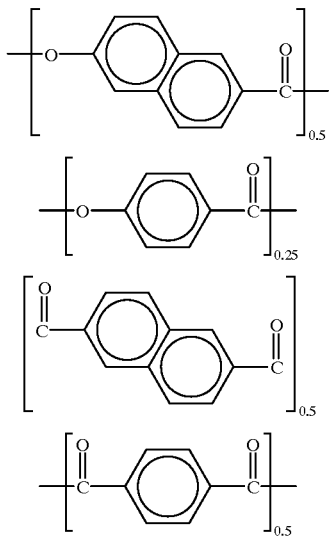

-continued

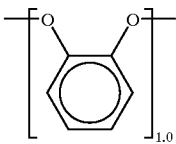

Optically active polyester (2)

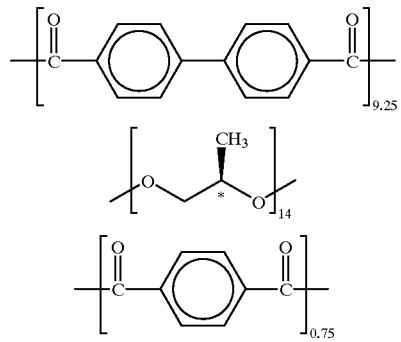

Example 2

7 g of a polymerized rosin polyhydric alcohol ester, 6 g of a rosin-modified phenolic resin, and 57 g of toluene were added to 300 g of the fine particles prepared in Example 1 to afford an ink. Using this ink, gravure printing was performed. As a result, there was obtained a printed matter of blue color having a strong selective reflection for a specific circularly polarized light.

Example 3

78 g of the nematic liquid crystalline polyester (1) and 22 g of the optically active polyester (2) both used in Example 1 were dissolved in 900 g of N-methylpyrrolidone to prepare a 10% polymer solution. Then, 200 g of carbon black (MA100, a product of Mitsubishi Chemical Co.) was added to the solution, followed by agitation for dispersion. Then, using a spray dryer (SD-100, a product of Tokyo Rika Kikai Co.), the solution was heat-treated at 160° C., to afford 277 g of fine particles of red color exhibiting a strong selective reflection of circularly polarized light. 95% of the fine particles thus obtained were not larger than 300 µm in diameter. Central wavelength of selective reflection was 650 nm.

Example 4

7 g of a polymerized rosin polyhydric alcohol ester, 6 g of a rosin-modified phenolic resin, and 57 g of toluene were added to 30 g of the fine particles prepared in Example 2 to prepare an ink. Using this ink, gravure printing was performed. As a result, there was obtained a printed matter of red color exhibiting a strong selective reflection of circularly polarized light.

Comparative Example 1

78 g of the nematic liquid crystalline polyester (1) and 22 g of the optically active polyester (2) were melt-mixed together at 250° C. for 1 hour to afford a cholesteric polymer. 20 g of the polymer was then dissolved in 8 g of N-methylpyrrolidone to prepare a 20% polymer solution.

The solution was applied onto a polyethylene terephthalate film having a rubbed polyimide layer in accordance with a spin coating method. Then dried at 80° C., and heat-treated at 170° C., to form a 10 μm thick, cholesteric aligned film of red color exhibiting a selective reflection of circularly polarized light. The film was then peeled off from the aligning substrate and pulverized to afford fine particles of yellow color exhibiting a weak selective reflection of circularly polarized light.

Comparative Example 2

7 g of a polymerized rosin polyhydric alcohol ester 6 g of a rosin-modified phenolic resin, and 57 g of toluene were added to 30 g of the fine particles prepared in Comparative Example 1 to afford an ink. Using this ink, gravure printing was performed to give a printed matter of yellow color exhibiting no selective reflection of circularly polarized light.

Inks were prepared using the fine particles prepared in Examples 1, 3 and Comparative Example 1. As a result, the inks prepared using the fine particles obtained in Examples 1 and 3 were found to exhibit a selective refection of circularly polarized light, while as to the ink prepared using the fine particles obtained in Comparative Example 1, it was impossible to observe any circularly polarized light selectivity.

What is claimed is:

1. A fine particle comprising a non-liquid crystalline fine particle as a nucleus and a thin cholesteric liquid crystal film formed on the surface of the non-liquid crystalline fine particle, said thin cholesteric liquid crystal film exhibiting a selective reflection of circularly polarized light substantially in all directions of the non-liquid crystalline fine particles.

2. A fine particle as set forth in claim 1, wherein the cholesteric liquid crystal comprises a cholesteric liquid crystalline polymer, said cholesteric liquid crystalline polymer being a cholesteric liquid crystalline polymer composition comprising a nematic liquid crystalline polymer and an optically active component, or a cholesteric liquid crystalline polymer containing an optically active group in the molecule thereof.

3. A fine particle according to claim 2, wherein the nematic liquid crystalline polymer is a nematic liquid crystalline polyester.

4. A fine particle according to claim 1, wherein the non-liquid crystalline particle is a fine organic resin particle or a fine organic particle.

5. A method for producing the fine particle described in claim 1, which method comprises dispersing non-liquid crystalline, fine organic or inorganic particles in a cholesteric liquid crystal solution thereby creating a dispersion, thereafter treating the dispersion by means of a dryer in a temperature region in which the cholesteric liquid crystal forms a cholesteric alignment thereby removing the solvent and forming the cholesteric alignment simultaneously, and subsequently cooling.

6. The method of claim 5 wherein the dryer is a spray dryer.

7. The method of claim 5 wherein the dryer is an airborn dryer.

* * * * *